United States Patent Office.

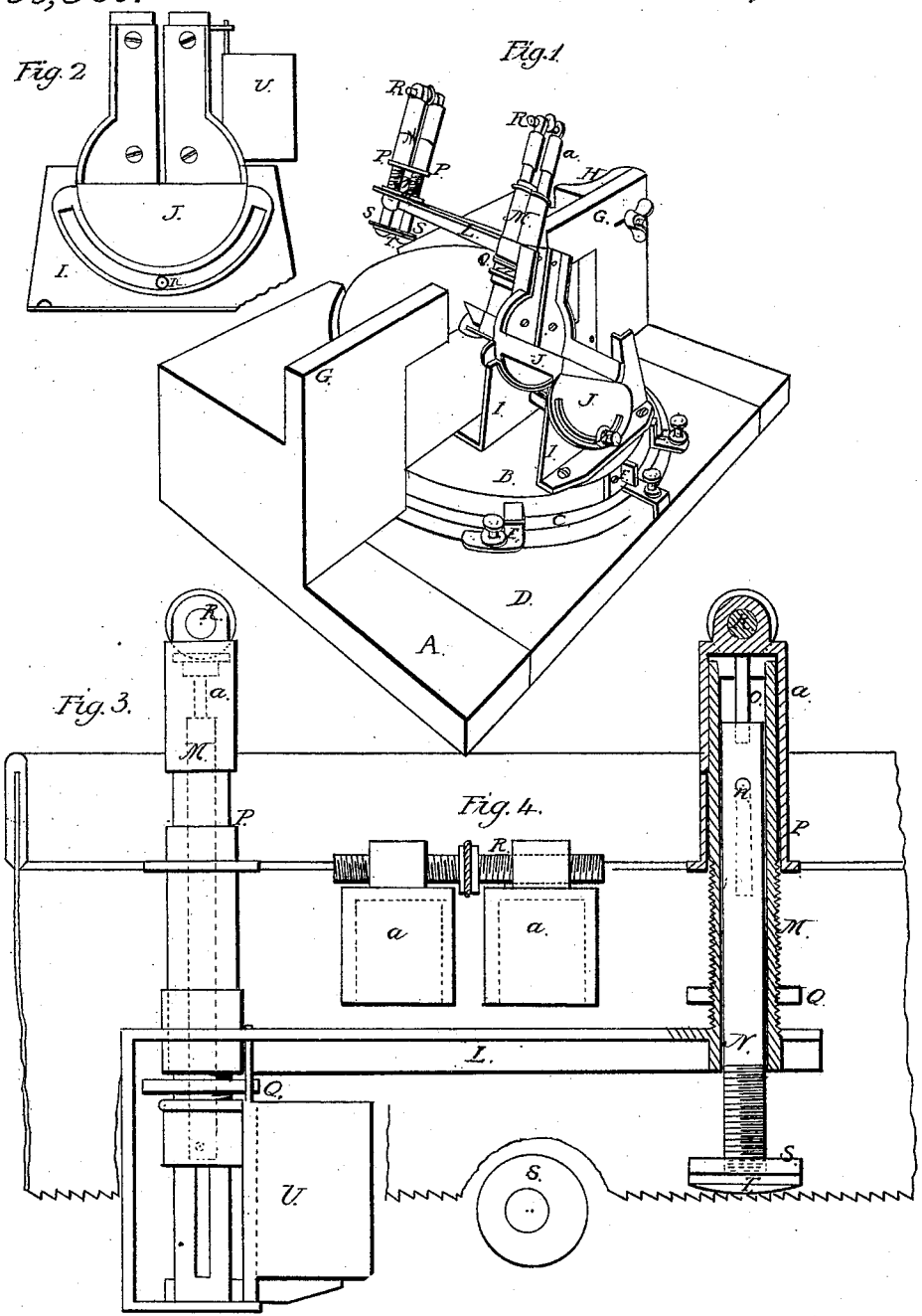

EZEKIEL ROOT, OF PARMA, MICHIGAN.

Letters Patent No. 90,960, dated June 8, 1869.

---

IMPROVEMENT IN MITRE-BOX.

---

The Schedule referred to in these Letters Patent and making part of the same.

---

*To whom it may concern:*

Be it known that I, EZEKIEL ROOT, of Parma, in the county of Jackson, and State of Michigan, have invented a new and useful Improvement in a Mitre and Bevel-Gauge; and do declare that the following is a true and accurate description thereof, reference being had to the accompanying drawings, and to the letters of reference marked thereon, and being a part of this specification.

Figure 1 is a perspective view of my combined gauge.

Figure 2 is an elevation of the cradle and vertical stop.

Figure 3 is an elevation, partially in section, of the saw-guides.

Figure 4 is a section of the saw-guides.

Like letters indicate like parts in each figure.

The nature of this invention relates to an improvement in the construction of a combined gauge, by the use of which the operator is enabled to saw a moulding at any desired angle or bevel, or to both angle or bevel, at one operation; also, to a new and ingenious arrangement of the saw-guides, whereby the saw is compelled to reciprocate in the same line at each stroke, and, on the completion of the cut, the saw is brought up with the guide, above the material sawed; and consists in a novel and peculiar arrangement of the various parts, as more fully hereinafter described.

A, in the drawings, represents the bed-plate of the apparatus, pivoted to the centre of which is a revolving disk, B, which may be of wood, and faced on the under edge with a metallic flange, C, the disk turning freely on its pivot.

Surrounding the disk is a metallic plate, D, on the bed-plate, provided with a circular slot, having its centre coincident with that of the disk; in which slot two dogs E may be secured by their set-screws to any angle desired, to arrest the central projecting stop F, on the disk.

The front half of the disk is cut down, so that the cradle of the saw-guides will not interfere with the downward progress of the saw to the bottom of the material being sawed. The rear part of the bed-plate is built up flush with the rear part of the disk, and is provided with the rest G, against which the wood is held, while a movable gauge, H, on the rest, will determine the lengths of the material to be cut off.

On the front of the disk is a circular bed, I, in which oscillates the cradle J, secured to an angle therein by the set-screw K, passing through a circular slot in its periphery and an aperture in the bed.

Secured to the table is a pair of guide-arms, L, from which rise the saw-guides M, whose construction is fully shown in section in fig. 3; and in which M is a hollow standard, threaded on its exterior, and rising from the arm L, and slotted vertically. Within this tube is a rod, N, provided with a guiding-stud, n, projecting through said slot, to guide it in its vertical movement.

This rod is suspended by a rubber, or other spring, O, attached to the top of the hollow standard, drawing it upward.

Connected to the stud n, and sliding on the standard, is a flanged sleeve, P, on which flange rests the rib on the back of a back-saw. Said saw in its downward progress stretching the spring O, carries down the sleeve P, with it.

The depth of cut may be regulated, if desired, by a screw nut, Q, on the cap a of the standard M, against which the sleeve P will strike, when the proper depth of cut is attained. A right and left-hand screw, R, engaging with sockets on the top of each pair of saw-guides, adjusts said guides so that the saw will work freely, and still be retained in its proper position.

Eccentric rings S, loosely sleeved near the bottom of the rods N, allow of a thicker or thinner saw to be used, as required, and when set are secured from turning by the jam-nut T.

The operation of this apparatus will be so readily understood by all mechanics, that I do not deem a further description thereof necessary.

I am aware that there are several devices which are designed to produce this result. I do not claim them, nor any of the distinctive features employed in them, but I do disclaim them, and particularly the improved mitre-box of H. B. Nash, for which letters patent were granted September 11, 1860.

What I do claim as my invention, and desire to secure by Letters Patent, is—

The arrangement of the hollow saw-guides M, connecting-brace L, laterally-adjusting screw R, and eccentric rings S, secured in place by the jam-nut T, flanged sleeve P, and rod N, connected with it, spring O, and vertically-adjusting screw-nut Q, upon the lower threaded portion of said guide M, when constructed and operating as and for the purpose aforesaid.

Also, in combination with the above-described guides, and their several parts before mentioned, the cradles J, adjusting-screw K, circular-beds I, disk B, bed-plate A, dogs E E, stop F, rest G, and movable gauge H, constructed, arranged, and operating, as and for the purpose before set forth.

EZEKIEL ROOT.

Witnesses:
N. W. DONNELLY,
C. E. McGEE.